US012724482B1

(12) United States Patent
Ostrover

(10) Patent No.: US 12,724,482 B1
(45) Date of Patent: Sep. 1, 2026

(54) SYSTEM AND METHOD FOR ADAPTIVE DIGITAL CONTENT CONTROL BASED ON USER GAZE INTENTION

(71) Applicant: Yaakov Ostrover, Kfar Yona (IL)

(72) Inventor: Yaakov Ostrover, Kfar Yona (IL)

( * ) Notice: Subject to any disclaimer, the term of this patent is extended or adjusted under 35 U.S.C. 154(b) by 4 days.

(21) Appl. No.: 19/066,449

(22) Filed: Feb. 28, 2025

(51) Int. Cl.
*G06F 3/01* (2006.01)

(52) U.S. Cl.
CPC .................................... *G06F 3/013* (2013.01)

(58) Field of Classification Search
CPC ....................................................... G06F 3/013
See application file for complete search history.

(56) References Cited

U.S. PATENT DOCUMENTS

2019/0370650 A1* 12/2019 Wheeler ................. G06F 3/015
2021/0216888 A1* 7/2021 Gatson ...................... G06F 3/16
2022/0155867 A1* 5/2022 Connor .................... G02C 5/14
2022/0382510 A1* 12/2022 Lee ......................... G06F 3/013
2023/0165460 A1* 6/2023 Abou Shousha ...... A61B 3/005 351/210
2025/0036195 A1* 1/2025 Fanelli .................... G06F 3/012
2025/0091214 A1* 3/2025 Kuang ..................... B25J 9/163
2025/0147652 A1* 5/2025 Braley .................... G06F 3/013
2025/0208702 A1* 6/2025 Osman .................... G06F 3/013
2025/0244828 A1* 7/2025 Patel ....................... G06F 3/012
2025/0349070 A1* 11/2025 Keetle-Maloney ..... G06F 3/013
2025/0377778 A1* 12/2025 Gitter ...................... G06F 3/013
2026/0051109 A1* 2/2026 Taylor ..................... G06F 3/012
2026/0079569 A1* 3/2026 Evangelidis ............ G06F 3/013

* cited by examiner

*Primary Examiner* — Ryan A Lubit

(57) ABSTRACT

The invention provides a system and method for adapting digital interfaces based on user gaze intention. Eye-tracking sensors, machine learning, and neural processing compute an Intentional Gaze Score (IGS) from fixation duration, pupil dilation, saccadic suppression, and gaze transitions. Interface elements dynamically adjust-fading, minimizing, or modifying responsiveness-only when intentional gaze surpasses a threshold, reducing cognitive overload and unintended activations. A hysteresis-based adaptation mechanism ensures smooth transitions, preventing abrupt content reappearance. The system leverages real-time neural inference for low-latency operation and integrates anomaly detection to mitigate adversarial gaze manipulations. Designed for cross-platform compatibility, it enhances interaction across computers, mobile devices, automotive displays, smart appliances, and extended reality (XR) applications, ensuring adaptive, context-aware digital interfaces.

15 Claims, 6 Drawing Sheets

SYSTEM AND METHOD FOR ADAPTIVE DIGITAL CONTENT CONTROL BASED ON USER GAZE INTENTION

FIELD OF THE INVENTION

The present invention relates to human-computer interaction systems and user experience (UX) design. More particularly, it pertains to a system and method for detecting a user's intentional gaze state and using it as a trigger to dynamically adjust digital content visibility, responsiveness, and interaction across various interfaces and platforms.

BACKGROUND OF THE INVENTION

Digital interfaces are increasingly used across numerous domains, including computer displays, mobile devices, smart appliances, digital signage, and extended reality systems. Conventional interfaces rely on physical inputs such as touch, keyboard, or mouse, as well as voice commands or gesture-based interactions. These methods can lead to cognitive overload, distraction, and unnatural interaction experiences.

While eye-tracking technology has been implemented in certain systems to detect gaze direction, current implementations fail to differentiate between passive seeing and intentional looking. Intentional looking represents a distinct cognitive state where a user engages deeply with an object or interface element.

There is a need for an adaptive system capable of detecting user intention through gaze patterns and physiological markers. This system should dynamically adjust digital interfaces across multiple domains and applications to enhance usability and reduce unnecessary distractions.

PRIOR ART ANALYSIS

1. U.S. Pat. No. 9,454,225B2—Gaze-Based Display Control
   This patent describes a system that detects a user's gaze direction and adjusts digital interface elements based on the detected fixation. Distinction:
   The present invention differentiates between passive seeing and intentional looking using an Intentional Gaze Score (IGS), which integrates multi-modal physiological markers such as fixation duration, saccadic suppression, and pupil dilation. Unlike U.S. Pat. No. 9,454,225B2, which solely relies on gaze position to trigger interface changes, the present invention ensures that interface adaptations occur only when a user's gaze intention surpasses a dynamically computed threshold, preventing unintended activations and improving interaction precision.
2. U.S. Pat. No. 8,593,375B2—Eye Gaze User Interface and Method
   This patent discloses an interface system that modifies content visibility based on the user's gaze movements and engagement time.
   Distinction:
   While U.S. Pat. No. 8,593,375B2 enables gaze-based interaction, it lacks an adaptive scoring system that classifies gaze intentionality based on multiple physiological and behavioral factors. The present invention employs Bayesian-weighted neural network analysis to distinguish intentional gaze from passive viewing, ensuring UI modifications are triggered only when engagement surpasses a computed intention threshold, reducing false activations.
3. US20200103963—Device Control Using Gaze Information
   This patent describes a system where a digital assistant identifies and selects devices for interaction based on user gaze direction. Distinction:
   Unlike US20200103963, which focuses on selecting devices based on gaze detection, the present invention dynamically modifies digital content presentation across interfaces, incorporating a real-time anomaly detection mechanism to prevent adversarial gaze manipulations. Additionally, the present invention uses rolling IGS computation per frame, ensuring continuous adaptation of digital interfaces rather than discrete gaze-triggered selections.
4. U.S. Pat. No. 9,230,221B2—Instruction System with Eye-Tracking-Based Adaptive Scaffolding
   This patent discloses an instructional system that tracks gaze movements and adjusts learning materials based on the user's engagement level. Distinction:
   While U.S. Pat. No. 9,230,221B2 applies eye-tracking to adjust educational content, it lacks a structured gaze classification model capable of differentiating intentional from passive gaze. The present invention extends beyond learning environments, applying its adaptive gaze-driven UI modification framework to a broad range of digital interfaces, including augmented reality, automotive displays, and interactive signage.
5. Gaze-Based User Interactions (Apple Patent)
   This patent describes an interface where users interact with digital content primarily through eye movements and gaze gestures.
   Distinction:
   The present invention differs by computing an Intentional Gaze Score (IGS) that integrates physiological cues like pupil dilation, blink rate modulation, and gaze transition patterns to classify user intention. Unlike Apple's patent, which primarily detects gaze direction for input, the present invention ensures gaze-driven interactions are intention-based, preventing accidental activations due to involuntary gaze shifts.
6. Adaptive Eye Tracking Machine Learning Model Engine (Nvidia Patent)
   This patent discusses machine learning models used to refine gaze-tracking accuracy dynamically.
   Distinction: Unlike Nvidia's patent, which focuses on gaze vector estimation, the present invention incorporates multi-sensor fusion with an anomaly detection module to prevent adversarial gaze manipulation. Additionally, the present invention's neural network applies multi-scale temporal sequence modeling with Bayesian weighting, enabling robust classification of intentional gaze states beyond basic gaze tracking.
7. Specific Patents Assigned to Tobii Technology AB
   a. U.S. Pat. No. 9,179,838B2-Eye/Gaze Tracker and Method of Tracking the Position of an Eye and/or a Gaze Point of a Subject
      Summary:
      This patent discloses an eye/gaze tracker equipped with first and second light sources, each configured to illuminate an eye of a subject. The system selectively emits light towards the eye in such a manner that, within an operation sequence, the eye is illuminated by the first light source during at least one first interval and by the second light source during at least one second interval.

Distinction:

While this system focuses on the method of illuminating the eye to track its position or gaze point, it does not assess the user's cognitive engagement or intention. In contrast, your invention computes an Intentional Gaze Score (IGS) by analyzing multi-modal physiological markers, ensuring that interface adaptations occur only when the user's engagement level meets a computed threshold, thereby reducing false activations and improving interaction predictability.

b. U.S. Pat. No. 12,100,176B2—Calibration of an Eye Tracking System

Summary: This patent describes a method for calibrating an eye tracking system that combines Pupil Center Corneal Reflection (PCCR) based eye trackers with non-PCCR based eye trackers. The calibration process involves obtaining at least one first eye position of a subject using the PCCR-based eye tracker and calibrating a head model of the non-PCCR-based eye tracker for the subject using the obtained eye position as ground truth.

Distinction: The focus here is on improving calibration accuracy between different eye tracking methodologies. Your invention, however, emphasizes real-time adaptive user interface modifications based on the user's gaze intention, as determined by the IGS, rather than calibration techniques.

c. U.S. Pat. No. 11,941,170B2-Method and System for Eye-Tracker Calibration Summary:

This patent presents a method for calibrating an eye-tracking device by presenting a video on a display, resizing and translating the video to various calibration positions, and recording calibration data based on the user's gaze at these positions.

Distinction:

This method aims to enhance calibration precision by using dynamic visual stimuli. In contrast, your invention focuses on dynamically adjusting digital interfaces based on a computed IGS, which reflects the user's intentional gaze, thereby enhancing user interaction without relying on calibration procedures.

d. U.S. Pat. No. 11,941,172B2-Training an Eye Tracking Model

Summary:

This patent involves training an eye-tracking model to predict eye tracking data based on sensor inputs from a primary eye-tracking sensor, using reference data generated by a secondary sensor for accuracy.

Distinction:

The emphasis here is on improving the predictive capabilities of eye-tracking models through training with reference data. Your invention, however, utilizes machine learning to compute an IGS for real-time interface adaptation based on user engagement, rather than solely enhancing predictive accuracy.

e. U.S. Pat. No. 11,934,571B2-Methods and Systems for a Head-Mounted Device for Updating an Eye Tracking Model Summary:

This patent outlines a system and method for updating an eye-tracking model in a head-mounted device. It involves obtaining sensor data related to the eye, moving the eye-tracking sensor relative to the eye, and updating the model based on the new positional data to maintain tracking accuracy.

Distinction:

While this patent addresses maintaining tracking accuracy in head-mounted devices through model updates, your invention is centered on analyzing gaze intention via the IGS to adapt digital content dynamically, independent of sensor positioning or model recalibration.

f. U.S. Pat. No. 10,025,379B2-Eye Tracking Wearable Devices and Methods for Use

Summary: This patent describes wearable devices equipped with eye-tracking systems that enable users to perform specific actions, such as activating a photo feature, by executing predetermined eye movements or gazing at particular regions within the user's environment.

Distinction:

While this invention focuses on recognizing specific eye movements or gaze regions to trigger discrete device functions, it does not incorporate a comprehensive analysis of multi-modal physiological markers to assess user intention. Your invention introduces the IGS, which evaluates fixation duration, saccadic suppression, pupil dilation, and gaze transitions to dynamically adjust digital content based on the user's cognitive engagement level.

g. EP2801009B1—System for Gaze Interaction

Summary:

This patent relates to systems and methods that utilize eye movement detection for interactive applications. It emphasizes the use of gaze data to facilitate user interaction with computer-implemented systems.

Distinction:

The system described primarily leverages gaze detection to enable user interactions but does not differentiate between passive and intentional gaze states. In contrast, your invention computes an IGS by analyzing various physiological markers, ensuring that interface adaptations occur only when a user's engagement level meets a computed threshold, thereby reducing false activations and enhancing interaction precision.

h. U.S. Pat. No. 6,578,962B1-Calibration-Free Eye Gaze Tracking

Summary:

This patent discloses a system and method for tracking a user's eye gaze vector and point of regard without requiring calibration, even during significant head movements or rotations.

Distinction:

The focus here is on providing accurate gaze tracking without calibration, addressing technical challenges related to head movements. Your invention, however, centers on interpreting the user's gaze intention through the IGS and dynamically modifying digital interfaces based on cognitive engagement, which is beyond the scope of mere gaze tracking accuracy.

i. U.S. Pat. No. 11,915,521B2-Zero Delay Gaze Filter
   Summary:
   This patent presents a method for processing a gaze signal in an eye-tracking system. It involves determining whether the user's eye movement is in fixation and, if so, applying a filter to the gaze signal to decrease variance.
   Distinction:
   While this method aims to enhance the stability of gaze signals during fixations, it does not assess the user's cognitive intent or adjust interface elements based on engagement levels. Your invention computes an IGS that evaluates multiple physiological markers to determine user intention, enabling dynamic and context-aware modifications to digital content.

8. WO2023091403A2—Gaze-Based User Interface with Assistant Features for Smart Glasses
   This patent describes a method for managing a user interface in smart glasses by identifying user eye gestures.
   Distinction:
   The system interprets specific eye movements to execute commands, enhancing hands-free interaction. While it focuses on wearable technology and gesture recognition, it does not delve into differentiating between passive and intentional gaze or dynamically adjusting content based on user intention.

9. 9. U.S. Pat. No. 9,851,791B2—Dynamic Eye Tracking Calibration
   This patent presents techniques for dynamically calibrating eye-tracking systems to maintain accuracy despite changes that may affect performance.
   Distinction:
   The system adjusts calibration parameters in real-time, ensuring consistent tracking precision. However, it does not address the interpretation of gaze intention or the adaptive modification of digital content based on user engagement.

10. U.S. Pat. No. 11,662,807B2—Eye-Tracking User Interface for Virtual Tool Control
   This patent relates to eye-tracking systems that enable users to activate and control virtual objects within augmented or virtual reality environments through gaze.
   Distinction:
   The interface allows for efficient selection and dismissal of virtual tools based on where the user is looking. While it enhances interaction in immersive environments, it does not incorporate a scoring system to assess gaze intentionality for dynamic content adaptation.

11. U.S. Pat. No. 10,904,611B2-Intelligent Automated Assistant for TV User Interactions
   This patent involves controlling television user interactions using a virtual assistant, potentially incorporating gaze data.
   Distinction:
   While it may utilize gaze tracking, it does not specifically compute an Intentional Gaze Score or dynamically adapt content based on user engagement.

12. U.S. Pat. No. 10,922,567B2-Cognitive State-Based Vehicle Manipulation
   This patent discusses using near-infrared imaging to assess a vehicle occupant's cognitive state, which could include monitoring gaze.
   Distinction:
   Its primary focus is on vehicle control rather than adaptive digital content modification based on gaze intention.

13. "Detecting Relevance during Decision-Making from Eye Movements for UI Adaptation" (Academic Paper)
   This research proposes a method to detect information relevance during decision-making by analyzing eye movements, enabling user interface adaptation.
   Distinction:
   The approach combines multiple gaze metrics to determine what information users find pertinent, allowing the interface to adjust accordingly. Although it focuses on relevance detection, it does not specifically compute an Intentional Gaze Score or address real-time anomaly detection to prevent adversarial manipulations.

14. "MIDAS: Deep Learning Human Action Intention Prediction from Natural Eye Movement Patterns" (Academic Paper)
   This study introduces a deep learning approach to predict human action intentions based solely on natural eye movement patterns.
   Distinction:
   While it offers insights into intention prediction, it does not discuss the dynamic adjustment of digital interfaces based on an Intentional Gaze Score or the integration of anomaly detection mechanisms.

SUMMARY OF THE INVENTION

The present invention provides a system and method for dynamically adjusting digital interfaces based on user gaze intention. The system comprises:

1. An eye-tracking module configured to monitor fixation duration, saccadic suppression, pupil dilation, and gaze transitions.
2. A machine learning processor employing multi-modal classification, Bayesian weighting, and neural network-based inference to compute an Intentional Gaze Score (IGS).
3. A content rendering engine that adapts interface elements (visibility, responsiveness, and interaction) in real-time based on IGS surpassing a dynamic threshold.
4. An anomaly detection system designed to mitigate adversarial gaze manipulation and ensure accurate classification without disrupting natural viewing behavior.

These components work together to create a dynamic interface adaptation framework that reduces cognitive load while maintaining an intuitive user experience across multiple platforms, including but not limited to: computer interfaces, smartphones, digital signage, smart home controls, automotive displays, medical interfaces, and extended reality (XR) applications such as virtual reality (VR), augmented reality (AR), and mixed reality (MR).

Sensor Array [101]: Captures real-time gaze data using a combination of infrared cameras and multi-sensor inputs.

Processing Modules [102]: Utilizes Neural Network Processing and FPGA/GPU Architecture to compute the Intentional Gaze Score (IGS) for classifying gaze intention.

Anomaly Detection [104]: Differentiates between passive gaze and adversarial gaze behaviors, preventing unintended interface triggers.

Interface Adaptation [103]: Dynamically modifies digital interfaces based on IGS thresholds to adjust content visibility, responsiveness, and interaction.

Dashed lines represent data flow between system components, ensuring synchronized processing for accurate gaze intention classification and adaptive UI adjustments.

Figure 1:
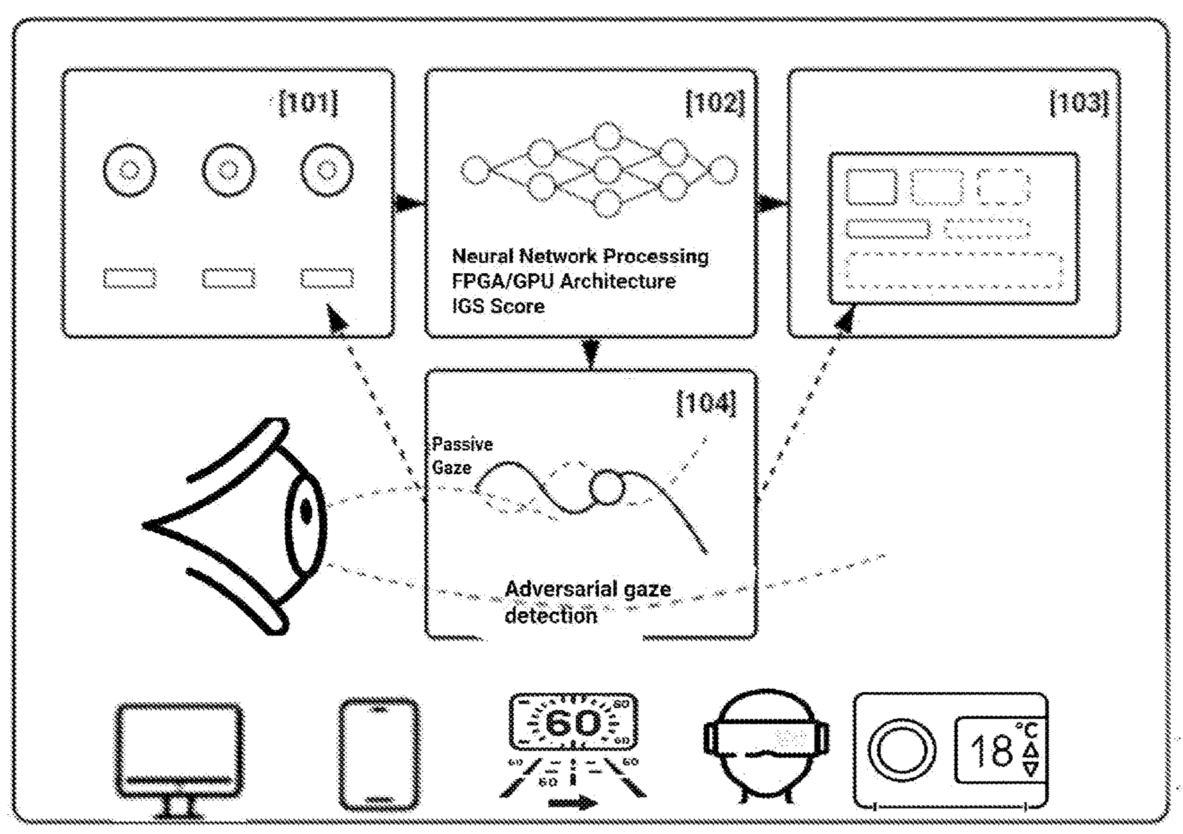
FIG. 1—Eye-Tracking System Architecture
   This figure describes a schematic diagram of the eye-tracking system architecture, illustrating the relationship between the Sensor Array [101], Processing Modules [102], Anomaly Detection [104], and Interface Adaptation [103], which together enable real-time detection and classification of intentional gaze states.
Figure 2:
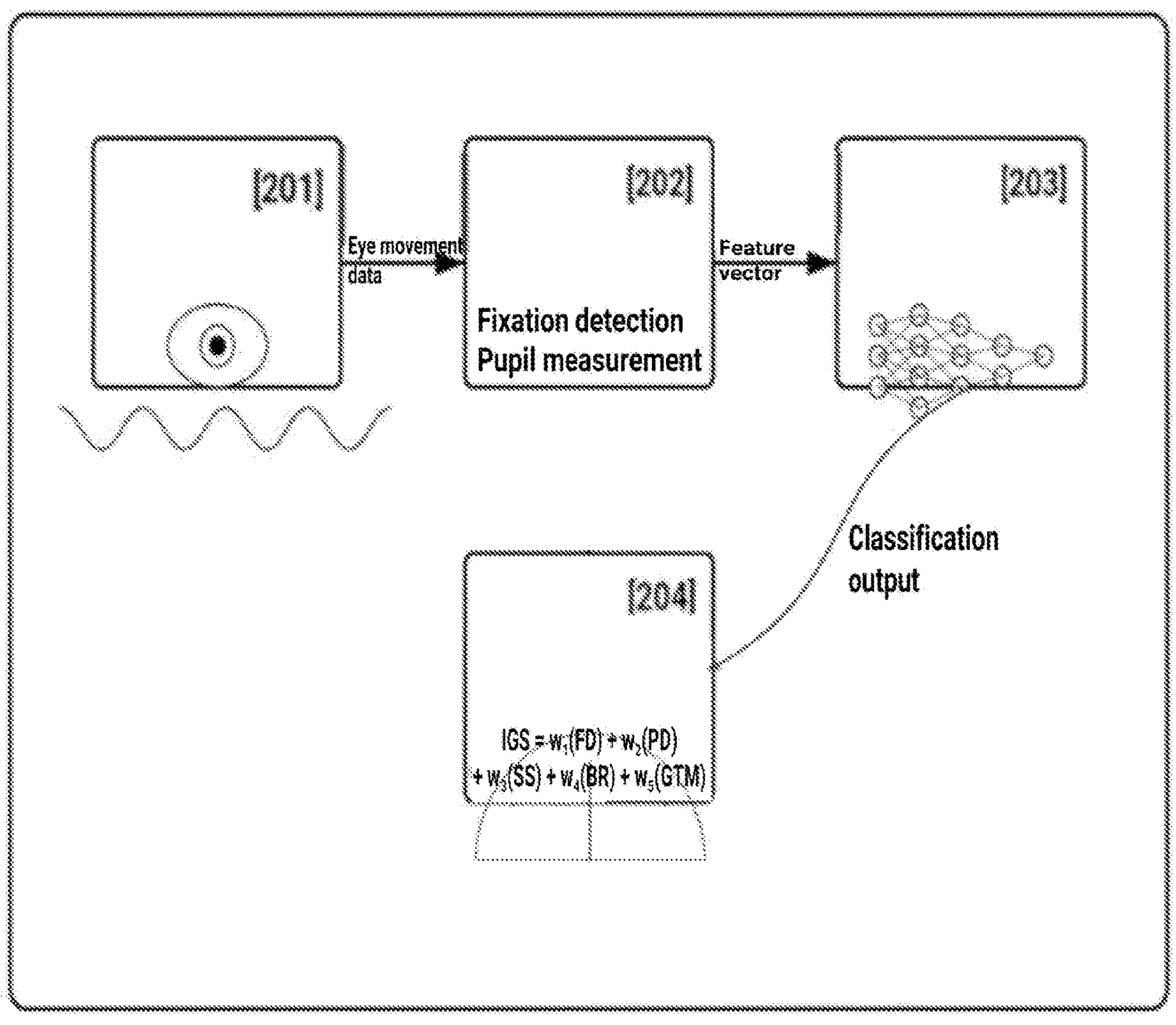

2. FIG. 2—Gaze Detection and Classification Process

This figure describes a schematic representation of the Gaze Detection and Classification Process, outlining the transformation of raw eye-tracking data into an Intentional Gaze Score (IGS) for adaptive interface modifications.

Raw Eye Measurements [201]: Captures fixation duration, pupil dilation, saccadic movements, blink patterns, and gaze transitions using a multi-sensor array.

Feature Extraction [202]: Processes gaze data to extract key physiological markers, including:

Fixation Detection

Pupil Measurement

Saccadic Suppression Analysis

Gaze Transition Matrices

Blink Rate Modulation

Pupillary Response Trends

Intention Classification [203]: Applies Bayesian-weighted neural networks and multi-modal inference models to distinguish intentional gaze from passive gaze, ensuring accurate engagement detection.

IGS Computation Module [204]: Aggregates extracted features to calculate a rolling IGS score per frame, supporting:

Dynamic Adaptation of Interface Elements

Prevention of Unintended Gaze Activations

Anomaly Detection for Adversarial Manipulations

Threshold-Based Content Modifications (visibility, responsiveness, and interaction timing)

The Intentional Gaze Score (IGS) is computed using a weighted function:

$$IGS=w\_1(FD)+w\_2(PD)+w\_3(SS)+w\_4(BR)+w\_5(GTM)$$

Where:

FD=Fixation Duration

PD=Pupil Dilation

SS=Saccadic Suppression

BR=Blink Rate

GTM=Gaze Transition Matrices

Weights ($w_1$–$w_5$) are dynamically adjusted based on environmental conditions and user-specific calibration parameters.

Dashed lines represent data flow between components, ensuring synchronized feature extraction, classification, and IGS computation for real-time adaptive interface modifications.

Figure 3:
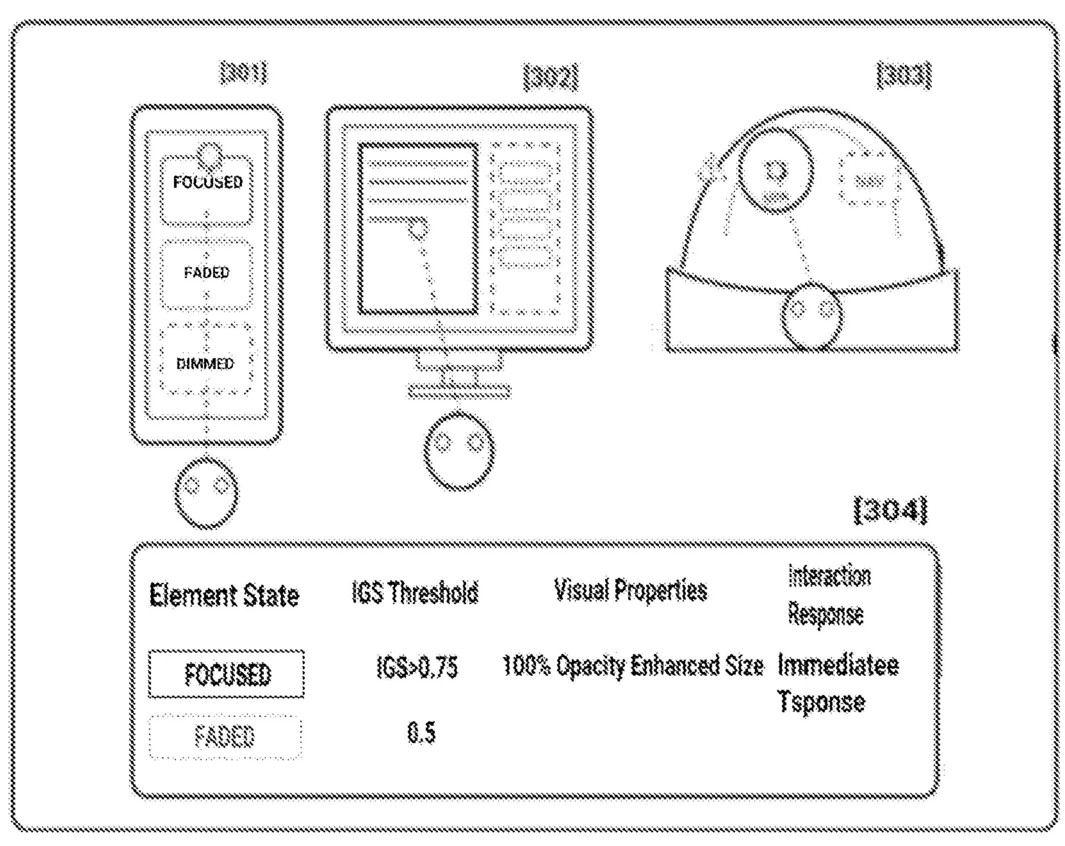

3. FIG. 3—Adaptive Interface Interaction Based on User Gaze Intention

This figure illustrates gaze-driven adaptive interface interactions across different digital environments.

Smartphone Display [301]: Upon intentional gaze detection, the interface highlights or enhances focused elements while dimming, fading, or minimizing non-focused components to reduce distractions.

Computer Screen [302]: The system modulates interactive elements, including buttons, links, and menus, based on user engagement levels.

Hysteresis-based transitions prevent accidental activations from brief gaze fixations.

Gaze-tracking scrolling assistance enables smooth navigation through documents or web pages.

Automotive Heads-Up Display (HUD) [303]:

Real-time driver gaze tracking adjusts dashboard visibility to prioritize critical driving information.

Speedometer, navigation, and alerts dynamically adjust based on detected engagement levels.

Anomaly detection prevents unintended gaze-based interactions caused by quick glances.

Interface Adaptation Mechanism [304]:

Adaptive Display Control: The system gradually modifies UI elements through progressive fading, size modulation, and contrast enhancements.

Threshold-Based Content Adjustment: Interface elements respond only when IGS surpasses a predefined threshold, preventing false activations.

Context-Aware UI Behavior: Ensures content re-engagement only when gaze transitions indicate a shift in user attention.

Dashed lines represent data flow between gaze-tracking modules and interface adaptation mechanisms, ensuring real-time synchronization between gaze analysis and UI response.

Figure 4:
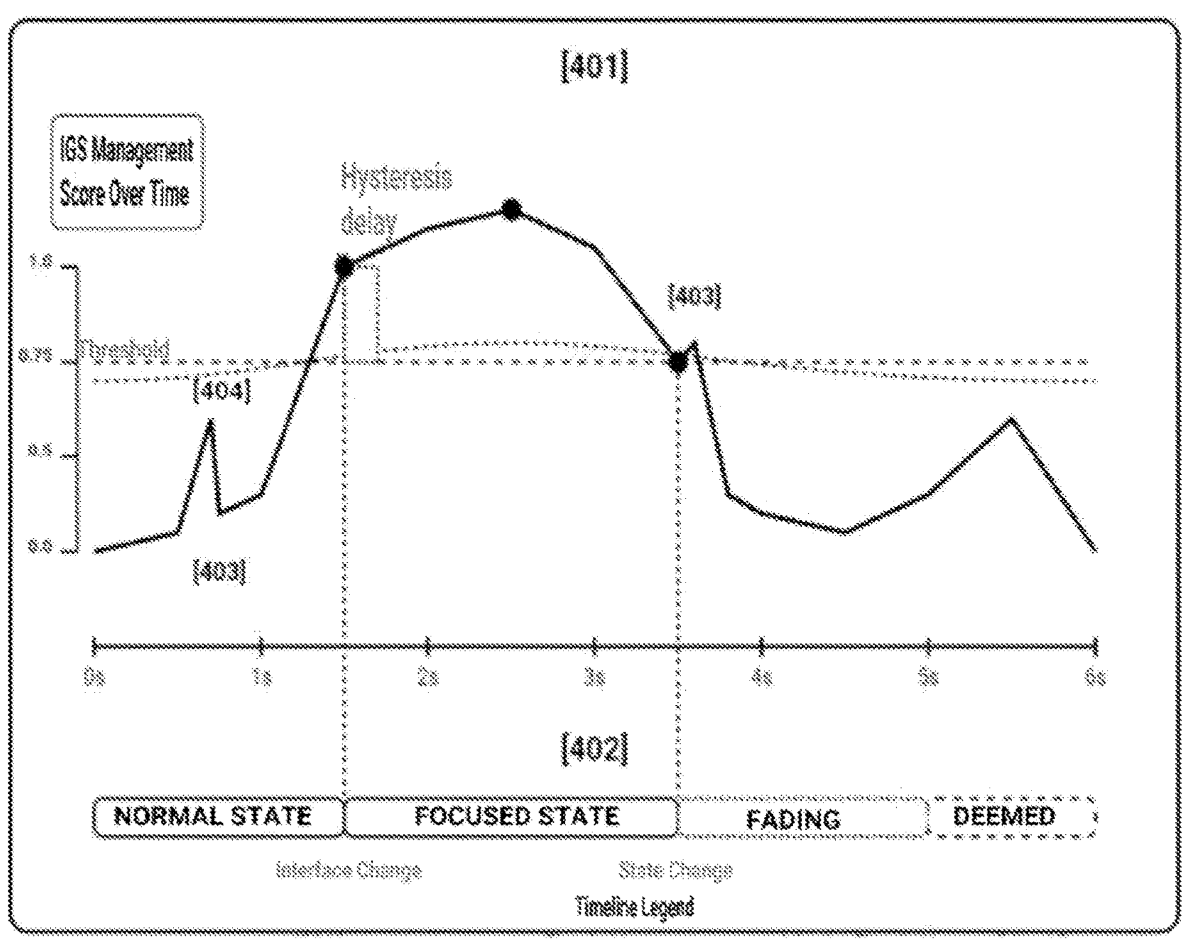

4. FIG. 4—Real-Time Timeline of Interface Adjustments

This figure visualizes the timeline of interface modifications based on detected gaze intention. The system continuously monitors the Intentional Gaze Score (IGS) and applies adaptive modifications when the computed IGS surpasses the adaptive threshold [404].

IGS Value Fluctuation: The graph illustrates variations in gaze intention levels.

Threshold-Based Interface Modifications: UI elements are adaptively adjusted as gaze intention increases or decreases.

Hysteresis Delay Zones: Implemented to ensure smooth transitions, preventing sudden UI changes caused by rapid gaze fluctuations.

Dashed lines indicate synchronized data flow between gaze detection, IGS computation, and interface adaptation mechanisms, ensuring that UI modifications occur in real time and remain context-aware.

Figure 5:
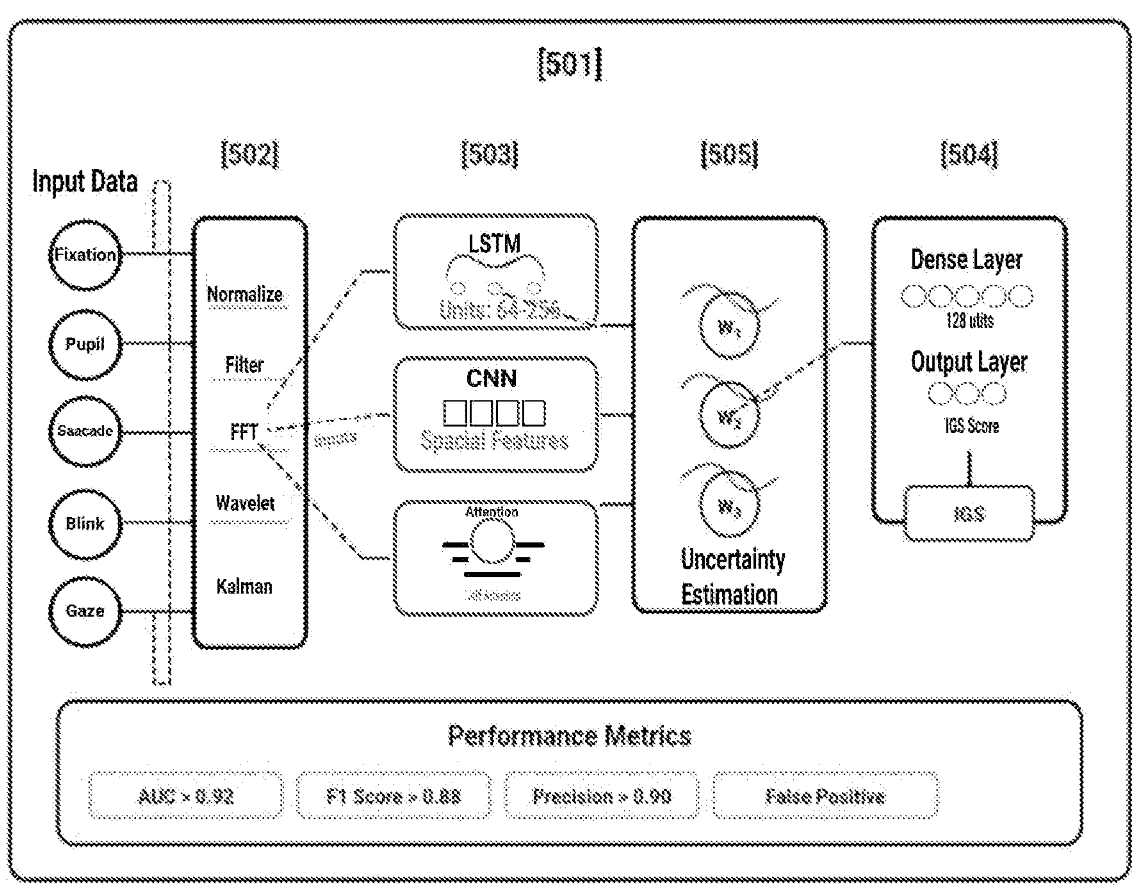

5. FIG. 5—Neural Network Architecture for Gaze Intention Classification

This figure details the neural network architecture [501] for gaze intention classification.

Input Layer: Captures fixation duration, pupil dilation, saccadic movement, blink rate, and gaze transitions.

Pre-Processing Layers [502]: Perform signal normalization, filtering, frequency analysis (FFT), wavelet decomposition, and Kalman filtering.

Feature Extraction Modules [503]: Utilize Long Short-Term Memory (LSTM) networks, Convolutional Neural Networks (CNNs), and self-attention mechanisms.

Bayesian Weighting [505]: Adjusts classification confidence dynamically.

Final Classification Layers [504]: Compute the Intentional Gaze Score (IGS).

The system achieves:

AUC>0.92

F1 Score>0.88

False Positive Rate<8%

Kappa>0.85

Dashed lines and event markers indicate data flow and feature transformations, ensuring structured gaze signal processing.

Figure 6:
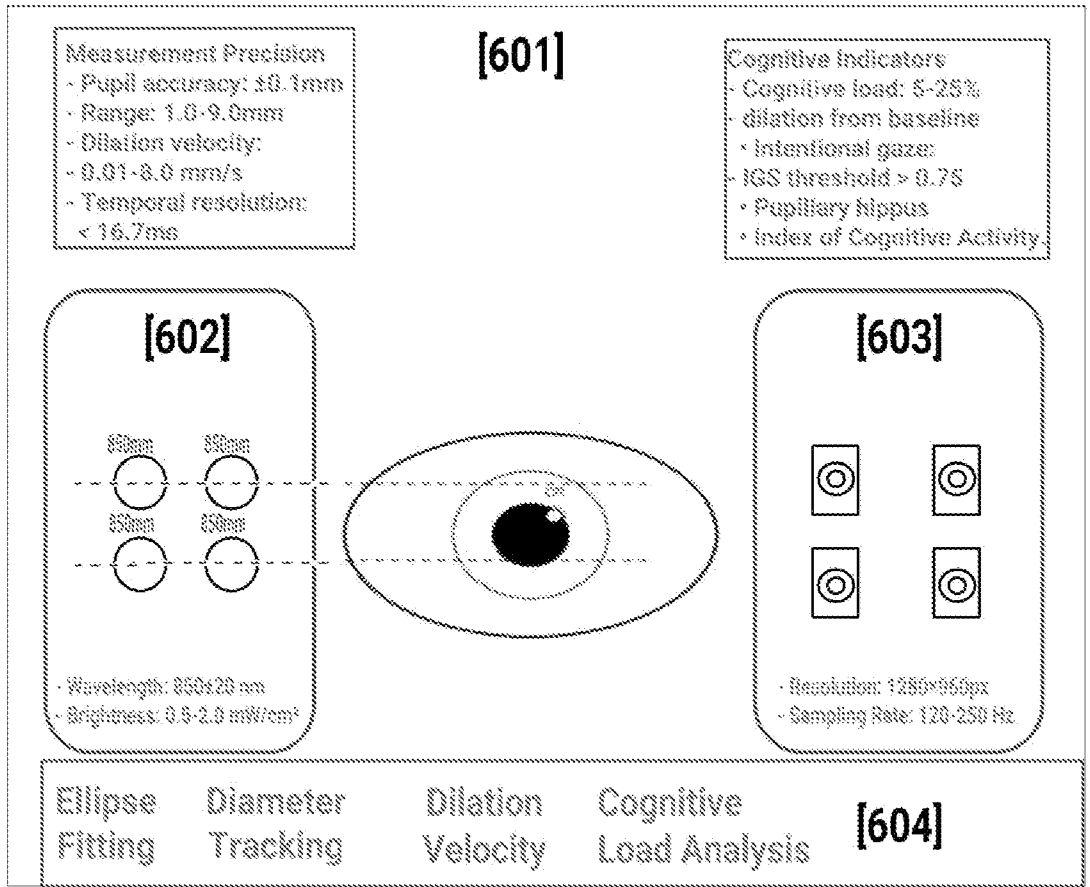

6. FIG. 6—Pupillometric Measurement System

This figure illustrates the Pupillometric Measurement System [601], which integrates with the broader eye-tracking framework for real-time physiological signal interpretation.

Infrared Illumination Sources [602]: Emit 850±20 nm near-infrared (NIR) light, ensuring consistent pupil tracking across various lighting conditions.

High-Speed Cameras [603]: Capture gaze data at 1280×960 resolution with a 120-250 Hz sampling rate, enabling precise pupil diameter measurement and saccadic movement tracking.

Pupil Dilation Analysis Modules [604]: Process gaze data to:

Detect dilation velocity (0.01-8.0 mm/s)

Analyze cognitive load indicators

Apply ellipse fitting algorithms for pupil boundary estimation

Ensure ±0.1 mm measurement accuracy for pupil diameter

Dashed lines represent data flow between infrared illumination sources [602], high-speed cameras [603], and pupil dilation analysis modules [604], demonstrating synchronized system operation for gaze-based interaction tracking.

DETAILED DESCRIPTION OF THE INVENTION

1. System Overview

Intentional gaze detection is achieved using a machine learning-based multi-modal classification model. The system evaluates fixation duration, pupil dilation trends normalized to ambient lighting, blink rate modulation, and gaze transition consistency matrices. Each parameter is continuously validated against the user's established baseline patterns to prevent misclassification.

To maintain robustness against adversarial gaze manipulation, the system incorporates an anomaly detection module that identifies gaze behaviors inconsistent with natural human viewing patterns. This prevents artificial prolongation of fixations or other attempts to trigger interface changes unintentionally.

The Intentional Gaze Score (IGS) is computed dynamically, using Bayesian weighting, temporal sequence modeling, and attention mechanisms. The system ensures non-predictable timing variations in interface adaptations, preventing users from exploiting consistent timing patterns to anticipate changes.

2. Eye-Tracking Hardware and Sensors Specifications

The system operates with the following hardware specifications:

a. Camera Array: High-frequency infrared (IR) cameras with minimum 1280×960 pixels resolution b. Sampling Rate: 120-250 Hz frame capture frequency c. Spectral Sensitivity: 750-950 nm wavelength detection d. Illumination: Near-infrared LEDs operating at 850±20 nm wavelength with structured illumination pattern e. Camera Configuration: Multiple camera setup (2-4) for stereoscopic tracking and redundancy f. Adaptive Brightness: 0.5-2.0 mW/cm$^2$ controlled based on ambient lighting conditions g. Pupillometric Precision: Pupil diameter measurement accuracy of +0.1 mm h. Measurement Range: Pupil diameter range of 1.0-9.0 mm with constriction/dilation velocity detection of 0.01-8.0 mm/s 3. Measurement Methodology a. Oculomotor Parameter Measurement The system captures and analyzes multiple eye movement types and characteristics:

1. Fixation Metrics
2. Minimum fixation duration threshold: 80-100 ms
3. Spatial dispersion threshold: 0.5-2.0 degrees visual angle
4. Fixation stability measurement: Root mean square of displacement<0.5° during steady fixation
5. Sequential fixation pattern mapping for intention inference
6. Saccadic Eye Movement Analysis
7. Velocity threshold: 20-40 degrees per second for saccade detection
8. Acceleration profile: 3000-6000 degrees per second$^2$ peak acceleration measurement
9. Micro-saccade detection: Capability to detect movements of 0.1-0.5°
10. Saccadic suppression period detection: 20-50 ms b. Smooth Pursuit Tracking 1. Gain measurement: Ratio of eye velocity to target velocity (0.1-1.0)
2. Pursuit initiation latency: 80-160 ms measurement capability
3. Catch-up saccade detection during smooth pursuit
4. Maximum velocity tracking: Up to 30 degrees per second c. Vergence Eye Movement Analysis 1. Convergence/divergence measurement: 0.5-50 degrees range
2. Vergence velocity: 1-25 degrees per second measurement capability
3. Disparity detection threshold: <0.1 degrees between eyes
4. Accommodation-vergence relationship analysis d. Pupillary Response Measurement The system includes specialized pupillometry to detect cognitive and attentional states:

1. Pupil diameter baseline establishment through calibration
2. Dynamic response to cognitive load: 5-25% dilation from baseline
3. Temporal resolution: <16.7 ms for real-time pupil dilation tracking, integrated into the Intentional Gaze Score (IGS) computation. Pupil dilation above 5-25% from baseline is weighted as an indicator of deep cognitive engagement and intentionality.
4. Pupillary hippus detection (small oscillations) as cognitive indicators
5. Index of Cognitive Activity (ICA) calculation from pupillary response
6. Intentional Gaze Detection Integration:

Pupil dilation trends are combined with fixation duration and saccadic suppression metrics to enhance accuracy in gaze intention classification.

This ensures that UI adaptation is only triggered when the IGS surpasses 0.75, avoiding false activations from involuntary gaze behaviors.

4. Intentional Gaze Measurement Framework
   a. Defining Intentional Gaze
      1. Intentional gaze differs from passive gaze and is characterized by measurable physiological and oculomotor signals. These include fixation duration, saccadic suppression, pupil dilation, and gaze transition stability.
      2. Intentional gaze is formally defined when:
      3. Fixation duration (FD) exceeds 500 ms-3000 ms, indicating sustained attention.
      4. Pupil dilation (PD) increases by 5-25% from baseline, suggesting cognitive engagement.
      5. Saccadic suppression (SS) reduces saccadic eye movements below 10°/sec for a given fixation target.
      6. Blink rate (BR) modulation, where blinks reduce to 4-12 blinks per minute during deep focus.
      7. Gaze Transition Matrix (GTM) consistency, where gaze revisits key interface elements in structured sequences.
   b. Intentional Gaze Score (IGS) Computation To objectively determine intentional gaze, the system computes an Intentional Gaze Score (IGS) using a weighted model:

□IGS=$w$_1(FD)+$w$_2(PD)+$w$_3(SS)+$w$_4(BR)+$w$_5(GTM)

Where:

w_1 to w_5 are dynamically optimized weights.

An IGS>0.75 (on a 0-1 scale) indicates a high-confidence intentional gaze state.
   c. Experimental Validation
      1. A validation study was conducted where participants performed passive and intentional viewing tasks while eye-tracking data was collected.
      2. The ML model trained on this dataset achieves AUC>0.92 in distinguishing intentional vs. passive gaze.
      3. Results confirm that intentional gaze is consistently detectable and influences UI adaptation.

5. Machine Learning Architecture
   a. Data Processing Pipeline

The system employs a multi-stage processing pipeline for eye data:
      1. Pre-processing Module
         a. Corneal reflection detection and elimination
         b. Pupil center estimation using ellipse fitting algorithms (accuracy±0.5 pixel)
         c. Adaptive thresholding based on ambient lighting conditions
         d. Kalman filtering for noise reduction and prediction (15-30 ms forward prediction)
      2. Feature Extraction Engine
         a. 45-120 dimensional feature vector extraction per frame
         b. Temporal windowing: 100 ms to 3000 ms adaptive windows based on interaction context
         c. Frequency domain analysis using Fast Fourier Transform for periodic patterns
         d. Wavelet decomposition for multi-scale temporal feature analysis
         e. Gaze transition matrix formation for sequential pattern recognition
   b. Neural Network Architecture
      1. Recurrent Neural Network with LSTM or GRU cells (64-256 units)
      2. Attention mechanism for temporal importance weighting
      3. Bayesian inference layer for uncertainty estimation
      4. Transfer learning capability from pre-trained eye movement models
      5. Multi-headed output for classification of multiple intention states
      6. Performance Metrics
         a. Area Under Curve (AUC)>0.92 for binary intention classification
         b. F1 score>0.88 for multi-class intention categorization
         c. iCohen's Kappa>0.85 for inter-rater reliability with human annotations
         d. Confusion matrix analysis with <8% false positive rate requirements 6. Intentionality Detection Algorithm The system distinguishes intentional looking from passive seeing through a multi-modal approach:
   a. Intentionality Determination Parameters
      1. Fixation/saccade ratio analysis for intentional versus passive viewing
      2. Dwell time thresholds: Configurable 300-1000 ms for intentional focus
      3. Pupil dilation percentage change: 5-25% from baseline for intentional engagement
      4. Blink rate modulation: 4-40 blinks per minute range with attention correlation
      5. Gaze transition matrix analysis for contextual pattern recognition
   b. Multi-modal Fusion Approach
      1. Integration of pupillary, fixation, and saccadic features with weighted importance
      2. Context-weighted feature adjustment based on interface type and user task
      3. Temporal sequence modeling using bi-directional LSTM for pattern detection
      4. Confidence scoring mechanism (0-1.0) for classification reliability assessment
   c. User-specific Adaptation
      1. Personalized baseline calculation with 30-60 second calibration procedure
      2. Online learning for continuous adaptation (learning rate: 0.001-0.1)
      3. Transfer learning from population models to individual user profiles
      4. Drift compensation for changes in lighting and user fatigue 7. Technical Implementation Specifications
   a. Hardware Acceleration
      1. FPGA-based initial image processing pipeline (latency<5 ms)
      2. GPU acceleration for neural network inference (batch size 1-4)
      3. Edge TPU compatibility for low-power deployment
      4. ARM NEON optimization for mobile implementation
   b. Real-time Performance Requirements
      1. End-to-end latency: <50 ms from image capture to classification output
      2. Processing throughput: 90-240 fps depending on hardware configuration 3. CPU utilization: <15% on quad-core 2.5 GHz processor
4. Power consumption: 0.5-2.5 W depending on platform c. Calibration Methodology
1. 5-9 point spatial calibration procedure
2. Per-user corneal curvature model generation
3. Ambient light compensation through IR reflection modeling
4. Periodic drift correction through reference point verification d. Failure Detection and Recovery
1. Confidence threshold monitoring for unreliable measurements
2. Blink detection and interpolation (for blinks<400 ms)
3. Occlusion handling through predictive modeling
4. Fallback mechanisms for temporary tracking loss 8. Dynamic Interface Adaptation The system modifies digital interfaces based on detected intentions:

a. Content Visibility Modification
1. Progressive transparency adjustments (0-100%)
2. Size modification (50-150% of original dimensions)
3. Contrast and color adjustments for non-focal elements
4. Animation speed modulation based on attention level b. Contextual Awareness
1. Object relevance determination based on task context
2. Hierarchical importance assignment to interface elements
3. Background/foreground separation for selective focus
4. Anticipatory content pre-loading based on gaze patterns c. Timing Considerations
1. Hysteresis implementation: 200-500 ms delay before state changes
2. Gradual transition effects: 100-300 ms fade duration
3. Attention shift detection: <100 ms response time
4. Return-to-normal timing: Configurable 1-5 second delay 9. Integration Capabilities a. Cross-platform Deployment
1. Embedded systems integration (SoC with 4-16 TOPS capability)
2. Mobile device integration (ARMv8 architecture optimized)
3. Desktop computing platforms (x86-64 with SIMD acceleration)
4. Cloud computing interface for heavy computational models b. Multi-sensor Fusion Architecture
1. Integration with inertial measurement units (IMUs) for head movement compensation
2. Environmental light sensor fusion for illumination adaptation
3. Facial feature tracking for context enhancement
4. Physiological sensor integration (EEG, GSR) for multimodal intention verification c. API and Interaction Framework
1. Standard OpenXR compatibility layer
2. REST API for cloud-based processing
3. WebRTC integration for browser-based applications
4. Real-time messaging protocol for <20 ms latency event notifications d. Privacy-preserving Computation
1. On-device processing priority to minimize data transmission
2. Federated learning support for model improvement without data sharing
3. Differential privacy implementation with $\varepsilon<3.0$
4. Selective temporal downsampling for sensitive contexts

The invention claimed is:

1. A system for dynamically adjusting digital content based on user gaze intention, comprising an eye-tracking module configured to capture multi-modal gaze parameters including fixation duration, saccadic suppression, pupil dilation, and gaze transitions; a machine learning processor employing a weighted multi-modal inference model to compute an Intentional Gaze Score (IGS) using Bayesian weighting, neural network-based analysis, and temporal sequence modeling; a content rendering engine configured to modify display characteristics only when IGS surpasses an adaptive threshold indicative of intentional gaze, with non-predictable timing variations; and an anomaly detection system designed to identify gaze patterns inconsistent with natural viewing behavior, preventing adversarial gaze manipulation while preserving genuine intentional gaze classification.

2. The system of claim 1, wherein intentional gaze is determined based on a quantitative fusion of fixation duration, pupil dilation trends normalized to ambient lighting conditions, blink rate modulation patterns, and gaze transition consistency matrices, with each parameter continuously validated against the user's established baseline patterns to ensure classification accuracy while preventing deliberate manipulation.

3. The system of claim 1, wherein the content rendering engine dynamically modifies content visibility by progressively fading out, minimizing, or altering interface elements upon detection of intentional focus, with variable transition timing that maintains perceptual continuity while preventing timing-based exploitation, and gradually restoring elements when gaze intention shifts to a passive state using non-linear restoration curves.

4. The system of claim 1, further comprising a neural network inference module configured to compute a rolling Intentional Gaze Score (IGS) per frame, applying multi-scale temporal sequence modeling with attention mechanisms and robust Bayesian weighting to enhance gaze intention classification while maintaining resilience against adversarial gaze patterns designed to manipulate the classification system.

5. The system of claim 1, wherein the content adaptation applies to computer displays, mobile devices, digital signage, automotive interfaces, medical devices, industrial controls, and extended reality applications including virtual reality (VR), augmented reality (AR), and mixed reality (MR) displays, with each implementation maintaining the core intentional gaze detection while incorporating platform-specific optimizations that address the unique characteristics of each display technology without compromising classification accuracy.

6. The system of claim 1, wherein the eye-tracking module is integrated into eyewear, mounted on displays, embedded in device bezels, or implemented in standalone tracking hardware, with each implementation incorporating redundant sensing approaches and position verification to maintain tracking integrity while preserving the system's ability to detect and respond to genuine intentional gaze across various form factors.

7. The system of claim 1, wherein the eye-tracking data is processed using a secure computing architecture that prevents access to raw biometric data while maintaining full functionality for intentional gaze detection, implementing differential privacy techniques that protect user information without degrading the system's ability to distinguish between intentional and passive gaze states.

8. The system of claim 1, wherein the machine learning processor employs a hybrid neural network architecture combining recurrent neural networks for temporal pattern recognition with convolutional elements for spatial feature extraction, enabling robust classification of intentional gaze across diverse viewing contexts and user behaviors while maintaining resilience against potential adversarial manipulation.

9. The system of claim 1, wherein pupillary response is measured with high precision and interpreted through a context-aware model that accounts for environmental illumination, cognitive engagement, and emotional state to accurately detect intention-related dilation while filtering out confounding factors that could otherwise be exploited to bypass intention detection.

10. The system of claim 1, wherein the classification of intentional gaze achieves high accuracy through multi-factor verification that requires consistent intentionality signals across various physiological and behavioral metrics, implementing challenge-response verification for ambiguous cases without disrupting the user experience during clear instances of intentional gaze.

11. The system of claim 1, further comprising hardware acceleration through a distributed processing architecture that balances performance requirements with security measures, ensuring real-time response to intentional gaze while implementing computational safeguards that prevent exploitation of processing limitations without compromising the system's primary function of detecting and responding to genuine user intention.

12. A method for controlling digital content visibility based on gaze intention, comprising capturing real-time eye-tracking data with intermittent recalibration, detecting whether gaze is intentional or passive using multiple complementary classification approaches, validating intention classification against task context and user history, suppressing or minimizing interface elements upon verified detection of intentional focus with unpredictable timing variations, and resuming content presentation upon detecting a genuine shift in attention as determined by consistent changes across multiple intention indicators.

13. The method of claim 12, further comprising an override mechanism wherein users can manually restore content through predefined gestures or blinks that follow user-specific patterns established during system calibration, with adaptive security measures that balance accessibility with protection against systematic override exploitation.

14. The method of claim 12, wherein the detected gaze intention controls interaction with smart home devices, enabling control of appliances, lighting, temperature, and security systems through intentional looking combined with contextual validation that confirms user intent through complementary signals without imposing additional cognitive burden on legitimate users engaging in intentional control.

15. The method of claim 12, wherein a neural network utilizes a comprehensive feature vector extracted from eye movement data including fixation metrics, saccadic profiles, smooth pursuit characteristics, and vergence measurements, with dynamic feature weighting that prioritizes the most reliable signals under current operating conditions while maintaining the overall sensitivity to genuine intentional gaze.

* * * * *